Jan. 21, 1947.  H. J. HEPP  2,414,646
HYDRATION OF CYCLIC OLEFINS
Filed June 24, 1944
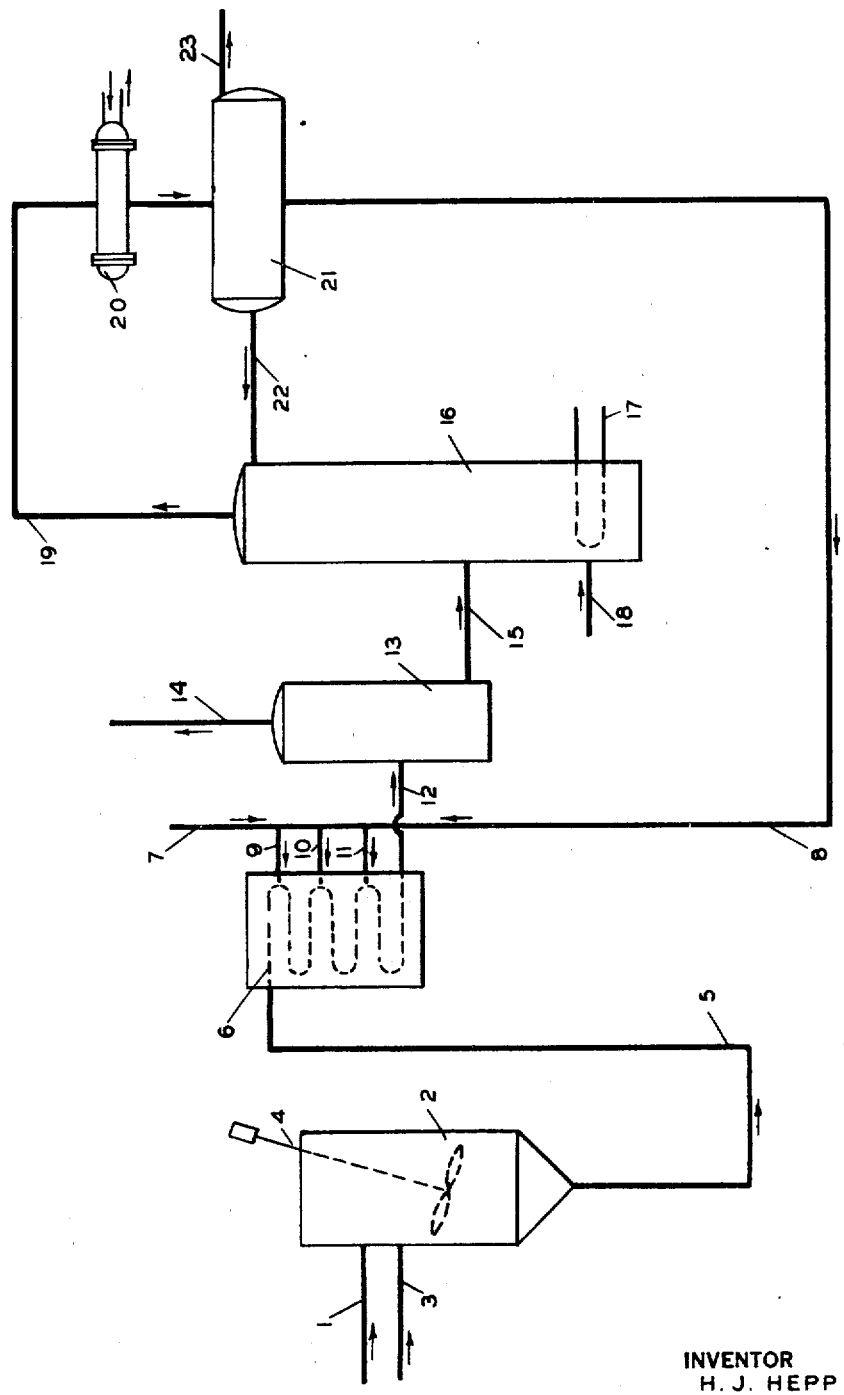
INVENTOR
H. J. HEPP
BY Hudson and Young
ATTORNEYS Patented Jan. 21, 1947

2,414,646

UNITED STATES PATENT OFFICE 2,414,646

HYDRATION OF CYCLIC OLEFINS

Harold J. Hepp, Bartlesville, Okla., assignor to Phillips Petroleum Company, a corporation of Delaware Application June 24, 1944, Serial No. 541,927

3 Claims. (Cl. 260—631)

The present invention relates to a process for the hydration of olefins to produce alcohols and more particularly to the hydration of cyclic olefins to produce cyclic alcohols and particularly those alcohols which are soluble to a substantial extent in water and form azeotropic mixtures with water that contain a greater proportion of water than is soluble in the alcohol at normal room temperature.

In some of its more specific aspects, it relates to the production of cyclopentanol and cyclohexanol by hydration of the corresponding cycloalkenes (cyclopentene and cyclohexene) in accordance with a novel and advantageous series of procedural steps.

Cyclopentene has heretofore been hydrated by heating with dilute aqueous sulfuric acid to produce cyclopentanol (Demjanov, J. Russ. Phys. Chem. Soc., 1910, vol 42, page 850; see also the copending application of James H. Boyd, Jr., Serial No. 456,822, filed August 31, 1942, now Patent No. 2,371,794). The hydration of cyclohexene in the presence of sulfuric acid has also been described (see U. S. Patent No. 1,948,891; British Patents No. 339,592 and 381,723; French Patent No. 700,067). In general, in accordance with the processes that have been described for the production of cyclohexanol by hydration of cyclohexene, cyclohexene is dissolved in an aqueous sulfuric acid solution containing approximately 80% $H_2SO_4$. Catalysts such as ferricyanic acid, ferrocyanic acid, metals and metal compounds of iron, cobalt, nickel and metals of the platinum group or other compounds, such as cuprous oxide, which favor the absorption of olefins may be present in the sulfuric acid. The acid is then diluted with water, unreacted cyclohexene is separated, and the cyclohexanol is thereafter separated from the dilute sulfuric acid and recovered in conventional manners.

In practicing such a process, cyclopentanol or cyclohexanol may be recovered from their respective diluted sulfuric acid solutions by distillation. However, both of these cycloaliphatic alcohols or cycloalkanols form azeotropic mixtures with water that contain substantial amounts of water and both cycloalkanols are soluble at normal temperatures to a substantial extent in water. Their azeotropic mixtures with water contain more water than is soluble in the alcohol at room temperature. Cyclohexanol is soluble to the extent of approximately 3.6 parts in 100 parts of water at 20° C. and cyclopentanol is soluble to the extent of approximately 9.6 volume per cent in water at 83° F. (28.3° C.). The recovery of cyclopentanol or cyclohexanol from the aqueous layer of the condensate of such azeotropic distillations may be affected by salting out the alcohol or by extraction of the aqueous layer with ether or other solvent that is insoluble in water or the alcohol. Such procedures do not effect a perfect separation and are costly. Heretofore the alcohols have not been separated from their aqueous solutions industrially because of the uneconomical nature of the processes that were available. The resulting losses in such hydration processes of making cycloalkanols have consequently been rather high since the azeotropes with water contain approximately 50% or more water by volume and substantial amounts of the alcohols are soluble in water at room temperature.

It is an object of the present invention to provide an improved process for the production of cyclopentanol and similar cycloalkenols by the hydration of cycloalkenes.

A further object of the present invention is to provide a simple and economical method for the recovery of cycloalkanols in their production by hydration of cycloalkenes.

Other objects and advantages of the invention, some of which are referred to specifically hereinafter, will be apparent to those skilled in the art to which the invention pertains.

In accordance with a preferred embodiment of the process of the invention, a cycloalkene, such as cyclopentene or cyclohexene, is absorbed in aqueous sulfuric acid of suitable concentration. The acid saturated with the cycloalkene, is then diluted with a large volume of water containing a cycloalkanol that was recovered from a subsequent step of the process. Fresh water is also added during the dilution in a suitable amount as hereinafter described. As a result of the dilution with water, the reaction mixture will generally increase in temperature. Heat is preferably abstracted from the reaction mixture in conventional manner during the dilution. Unreacted cycloalkene is removed or expelled from the reaction mixture and recovered.

The mixture of acid, water and cycloalkanol is then subjected to fractional distillation, whereby the cycloalkanol and water pass over as an azeotropic mixture which separates into two layers on condensing and cooling. These layers are respectively, (1) an aqueous layer, generally the lower or bottom layer, which consists of water with a small but substantial proportion of cycloalkanol, and (2) a cycloalkanol layer, which consists of cycloalkanol and a small proportion of water. Either or both of these layers may be partially circulated as reflux to the azeotropic distillation column. The cycloalkanol layer is then separated and dehydrated and further purified, if desired. The aqueous layer containing cycloalkanol, together with additional amounts of fresh water to replace that removed with the cycloalkanol layer and that discarded with the acid as bottoms in the distillation, is returned or recycled to the dilution step for dilution of further amounts of acid.

It has been found that the presence initially of the small but substantial proportion of cycloalkanol in the water which is used in the dilution or hydration step is of distinct advantage in the process in facilitating the hydration of the cycloalkene. Furthermore, by recycling the aqueous layer containing cycloalkanol, in accordance with the process of the invention, the complete recovery of the cycloalkanol without substantial losses is effected in a simple and advantageous manner.

The process of the invention is particularly adapted to the production of cyclopentanol from cyclopentene. Cyclopentanol is soluble in water to the extent of 9.6 per cent by volume at 83° F. (28.3° C.) and water is soluble in cyclopentanol to the extent of 16.8 per cent by volume at 83° F. The azeotrope with water has a distillation or boiling point of 96.58° C. and consists of approximately 43% cyclopentanol and 57% water by volume. Pure cyclopentanol has a boiling point of 140.6° to 140.8° C. The process of the invention is also adapted to the production of cyclohexanol and other alcohols (cyclic or aliphatic) by hydration of the corresponding olefins, although in some cases the advantages to be obtained may be less pronounced or beneficial than those apparent in the case of cyclopentanol, because of the different composition of the azeotropic mixture with water and the different solubility relationships with water. The process of the invention is relatively restricted in its application to those alcohols which are soluble to a substantial extent in water and which form azeotropic mixtures with water that contain a substantially greater proportion of water than is soluble in the alcohol at lower or normal room temperatures.

Although best results in the production of cyclopentanol by hydration of cyclopentene are obtained by observing certain optimum conditions as hereinafter specified, the improved process of the invention in general contemplates no changes in conventional procedures other than the novel step of subjecting the cycloalkanol to azeotropic distillation with water, allowing the condensate to stratify into two layers, and recycling the aqueous layer containing a small proportion of dissolved cycloalkanol to the hydration step. The procedure for absorbing the cycloalkene in the acid, the nature of the particular acid (sulfuric, phosphoric, hydrofluoric, etc.), the concentration of the acid, the absence or presence in the acid of materials which favor the absorption of cycloalkenes, the hydration procedure and such factors may all be varied or modified in known manner or as described in the art referred to hereinbefore.

The accompanying drawing is a flow diagram of a preferred method of practicing the process of the invention for the production of cyclopentanol from cyclopentene.

Cyclopentene is charged through conduit 1 into reactor 2 and aqueous sulfuric acid having a concentration of 60 to 80% by weight of $H_2SO_4$ is charged into the same reactor 2 through conduit 3. The reactor 2 is provided with an agitator or stirrer 4. The cyclopentene may be obtained from any source, for example, by partial hydrogenation of cyclopentadiene obtained by dehydrogenation of cyclopentane, as described in the copending application of Gardner C. Ray, Serial No. 493,688, filed July 6, 1943, or by catalytic dehydrogenation of cyclopentane in the presence of hydrogen, as described in my copending application Serial No. 540,070, filed June 13, 1944. The acid is stirred to facilitate the absorption of the cyclopentene. Approximately 1 liquid volume of cyclopentene is absorbed by 2 volumes of 60% to 80% sulfuric acid at room temperature. More concentrated sulfuric acid favors the polymerization of cyclopentene. Of the cyclopentene absorbed, approximately 70% is reacted and hydrated in the process whereas approximately 30% remains unreacted.

After sufficient cyclopentene is absorbed in the acid or the acid is substantially completely saturated with cyclopentene, the reaction mixture is charged through conduit 5 to cooling coil 6 where the acid is diluted with the aqueous phase containing dissolved cyclopentanol that was recovered from a subsequent step of the process together with any additional water that may be required. The fresh water is charged through conduit 7 and the aqueous phase containing dissolved cyclopentanol is charged through conduit 8 in which both streams mix. The mixed stream is charged to the cooling coil 6, preferably multi-pointwise, by injection through one or more conduits, as represented by conduits 9, 10 and 11. Sufficient surface is provided in cooling coils 6 to prevent undue rise of temperature during the dilution or hydration step.

The diluted acid is then passed through conduit 12 into separator 13, where the dilute acid is separated from the liquid hydrocarbon phase containing unreacted cyclopentene and other hydrocarbons. This liquid hydrocarbon phase contains substantially no dissolved cyclopentanol and is withdrawn through conduit 14 and is further treated for recovery of cyclopentene or other materials or is recycled directly to the reactor through conduit 1 with fresh cyclopentene charge stock, if desired. The acid phase in separator 13, containing dissolved cyclopentanol, is passed through conduit 15 to azeotropic distillation or fractionation column 16.

In the azeotropic distillation column 16, cyclopentanol is distilled as an azeotrope with water that contains approximately 43% per cent by volume of cyclopentanol at a boiling point of about 96° to 97° C. at atmospheric pressure. The composition of the azeotrope will vary somewhat with the pressure. The pressure prevailing during distillation may be varied somewhat within a more or less restricted range, as desired. Heat for the distillation is supplied through coil 17 by steam or other heat-exchange medium or by means of steam at a suitable temperature injected directly into column 16 through conduit 18, if desired. The overhead product, comprising vapors of the azeotrope of cyclopentanol and water passes through conduit 19 and condenser 20 into accumulator 21.

In accumulator 21 the condensate separates into two phases, namely, (1) a bottom aqueous phase containing approximately 9.6% by volume of cyclopentanol, and (2) a top cyclopentanol phase containing approximately 16.8% by volume of water. The composition of these phases will vary somewhat with the temperature prevailing in the accumulator and the values given are based upon a temperature of approximately 83° F. (28.3° C.). Portions of either phase or a portion comprising both phases may be recirculated through conduit 22 as reflux for column 16.

The top cyclopentanol phase in accumulator 21 is withdrawn through conduit 23 and is stored or subjected to further purification. The bottom aqueous phase is recycled through conduit 8 and is used to dilute additional acid in cooling coils 6, after addition of fresh water through 7 to compensate for that withdrawn from the system.

The process as described hereinabove is capable of being operated in a continuous, intermittent or batch manner, as understood in the art. Continuous operation is preferred.

Inasmuch as the foregoing description comprises preferred embodiments of the invention it is to be understood that the invention is not limited thereto and that modifications and variations may be made therein without departing from the invention, whose scope is to be limited solely by the appended claims.

I claim:

1. A process for the production of a partially water soluble cycloalkanol, containing a single ring of not more than six carbon atoms, which forms with water an azeotropic mixture containing a greater proportion of water than is soluble in the cycloalkanol at a temperature lower than the boiling point of the azeotrope by hydration of the corresponding cycloalkene which comprises absorbing the cycloalkene in aqueous sulfuric containing a substantial amount of sulfuric acid; diluting the aqueous sulfuric acid containing the absorbed cycloalkene with water recovered from a subsequent step of the process containing the cycloalkanol; cooling the acid solution during such dilution; recovering unreacted cycloalkene from the diluted acid; separating the cycloalkanol from the aqueous acid by distillation, whereby the cycloalkanol distills as an azeotropic mixture with water; condensing the resulting cycloalkanol-water azeotrope and allowing it to stratify into two layers; recovering the cycloalkanol from the cycloalkanol layer containing water; and recycling the water layer containing cycloalkanol for the dilution of further amounts of acid containing dissolved cycloalkene.

2. A process for the production of cyclopentanol by the hydration of cyclopentene, which comprises absorbing cyclopentene in aqueous sulfuric acid having a concentration within the range of approximately 60 to approximately 80 per cent by weight $H_2SO_4$, diluting said acid containing absorbed cyclopentene with an aqueous phase containing cyclopentanol that is recovered from a subsequent stage of the process, cooling said acid solution during dilution, recovering unreacted cyclopentene from the diluted acid, separating cyclopentanol from the aqueous acid by distillation, whereby the cyclopentanol distills as an azeotropic mixture with water, condensing said cyclopentanol-water azeotrope and allowing it to stratify into two layers, recovering cyclopentanol from the alcohol layer containing water, and recycling the aqueous phase containing a small proportion of cyclopentanol together with additional water to compensate for that removed from the system for dilution of further amounts of acid containing absorbed cyclopentene.

3. A process for the production of cyclohexanol by hydration of cyclohexene, which comprises absorbing cyclohexene in aqueous sulfuric acid which contains a substantial proportion of $H_2SO_4$, diluting said acid containing absorbed cyclohexene with an aqueous phase containing cyclohexanol that is recovered from a subsequent stage of the process, cooling said acid solution during dilution, recovering unreacted cyclohexene from the diluted acid, separating cyclohexanol from the aqueous acid by distillation, whereby the cyclohexanol distills as an azeotropic mixture with water, condensing said cyclohexanol-water azeotrope and allowing it to stratify into two layers, recovering cyclohexanol from the alcohol layer containing water, and recycling the aqueous phase containing a small proportion of dissolved cyclohexanol together with additional water to compensate for that removed from the system for dilution of further amounts of acid containing absorbed cyclohexene.

HAROLD J. HEPP.

---

Certificate of Correction

Patent No. 2,414,646.　　　　　　　　　　　　　　　　　　January 21, 1947.

HAROLD J. HEPP

It is hereby certified that error appears in the printed specification of the above numbered patent requiring correction as follows: Column 4, line 13, for "cyclopenttne" read *cyclopentene*; and that the said Letters Patent should be read with this correction therein that the same may conform to the record of the case in the Patent Office.

Signed and sealed this 15th day of April, A. D. 1947.

[SEAL]

LESLIE FRAZER,
*First Assistant Commissioner of Patents.* will vary somewhat with the temperature prevailing in the accumulator and the values given are based upon a temperature of approximately 83° F. (28.3° C.). Portions of either phase or a portion comprising both phases may be recirculated through conduit 22 as reflux for column 16.

The top cyclopentanol phase in accumulator 21 is withdrawn through conduit 23 and is stored or subjected to further purification. The bottom aqueous phase is recycled through conduit 8 and is used to dilute additional acid in cooling coils 6, after addition of fresh water through 7 to compensate for that withdrawn from the system.

The process as described hereinabove is capable of being operated in a continuous, intermittent or batch manner, as understood in the art. Continuous operation is preferred.

Inasmuch as the foregoing description comprises preferred embodiments of the invention it is to be understood that the invention is not limited thereto and that modifications and variations may be made therein without departing from the invention, whose scope is to be limited solely by the appended claims.

I claim:

1. A process for the production of a partially water soluble cycloalkanol, containing a single ring of not more than six carbon atoms, which forms with water an azeotropic mixture containing a greater proportion of water than is soluble in the cycloalkanol at a temperature lower than the boiling point of the azeotrope by hydration of the corresponding cycloalkene which comprises absorbing the cycloalkene in aqueous sulfuric containing a substantial amount of sulfuric acid; diluting the aqueous sulfuric acid containing the absorbed cycloalkene with water recovered from a subsequent step of the process containing the cycloalkanol; cooling the acid solution during such dilution; recovering unreacted cycloalkene from the diluted acid; separating the cycloalkanol from the aqueous acid by distillation, whereby the cycloalkanol distills as an azeotropic mixture with water; condensing the resulting cycloalkanol-water azeotrope and allowing it to stratify into two layers; recovering the cycloalkanol from the cycloalkanol layer containing water; and recycling the water layer containing cycloalkanol for the dilution of further amounts of acid containing dissolved cycloalkene.

2. A process for the production of cyclopentanol by the hydration of cyclopentene, which comprises absorbing cyclopentene in aqueous sulfuric acid having a concentration within the range of approximately 60 to approximately 80 per cent by weight $H_2SO_4$, diluting said acid containing absorbed cyclopentene with an aqueous phase containing cyclopentanol that is recovered from a subsequent stage of the process, cooling said acid solution during dilution, recovering unreacted cyclopentene from the diluted acid, separating cyclopentanol from the aqueous acid by distillation, whereby the cyclopentanol distills as an azeotropic mixture with water, condensing said cyclopentanol-water azeotrope and allowing it to stratify into two layers, recovering cyclopentanol from the alcohol layer containing water, and recycling the aqueous phase containing a small proportion of cyclopentanol together with additional water to compensate for that removed from the system for dilution of further amounts of acid containing absorbed cyclopentene.

3. A process for the production of cyclohexanol by hydration of cyclohexene, which comprises absorbing cyclohexene in aqueous sulfuric acid which contains a substantial proportion of $H_2SO_4$, diluting said acid containing absorbed cyclohexene with an aqueous phase containing cyclohexanol that is recovered from a subsequent stage of the process, cooling said acid solution during dilution, recovering unreacted cyclohexene from the diluted acid, separating cyclohexanol from the aqueous acid by distillation, whereby the cyclohexanol distills as an azeotropic mixture with water, condensing said cyclohexanol-water azeotrope and allowing it to stratify into two layers, recovering cyclohexanol from the alcohol layer containing water, and recycling the aqueous phase containing a small proportion of dissolved cyclohexanol together with additional water to compensate for that removed from the system for dilution of further amounts of acid containing absorbed cyclohexene.

HAROLD J. HEPP.

---

Certificate of Correction

Patent No. 2,414,646.     January 21, 1947.

HAROLD J. HEPP

It is hereby certified that error appears in the printed specification of the above numbered patent requiring correction as follows: Column 4, line 13, for "cyclopenttne" read *cyclopentene*; and that the said Letters Patent should be read with this correction therein that the same may conform to the record of the case in the Patent Office.

Signed and sealed this 15th day of April, A. D. 1947.

[SEAL]

LESLIE FRAZER,
*First Assistant Commissioner of Patents.*